United States Patent [19]

Hunter et al.

[11] Patent Number: 5,114,572
[45] Date of Patent: May 19, 1992

[54] FILTER ASSEMBLY AND CARTRIDGE THEREFOR

[75] Inventors: George S. Hunter, Richmond; Michael J. Hawker, Hadleigh, both of England

[73] Assignee: Process Scientific Innovations Limited, Bowburn, United Kingdom

[21] Appl. No.: 679,013
[22] PCT Filed: Sep. 7, 1989
[86] PCT No.: PCT/GB89/01054
    § 371 Date: May 7, 1991
    § 102(e) Date: May 7, 1991
[87] PCT Pub. No.: WO90/02597
    PCT Pub. Date: Mar. 22, 1990

[30] Foreign Application Priority Data

Sep. 9, 1988 [GB] United Kingdom ............. 8821238

[51] Int. Cl.⁵ ................................ B01D 27/08
[52] U.S. Cl. .................... 210/120; 210/148; 210/440; 210/444; 210/450; 210/472; 210/493.5; 210/502.1; 210/DIG. 17; 55/500; 55/502; 55/504; 55/521
[58] Field of Search ........... 210/120, 136, 148, 232, 210/234, 237, 238, 264, 282, 440, 443, 444, 450, 451, 455, 472, 493.1, 493.5, 497.01, 497.2, 500.1, 502.1, DIG. 5, DIG. 17; 55/498, 500, 502, 503, 504, 521

[56] References Cited

U.S. PATENT DOCUMENTS

| | | | |
|---|---|---|---|
| 4,331,535 | 5/1982 | Pett | 210/85 |
| 4,764,275 | 8/1988 | Roluichaud | 210/440 |
| 4,886,599 | 12/1989 | Bachnann et al. | 210/DIG. 5 |
| 4,949,141 | 9/1990 | Anderson | 210/502.1 |
| 4,989,636 | 2/1991 | Hunter et al. | 210/DIG. 17 |
| 4,992,166 | 2/1991 | Lousiky et al. | 210/440 |

FOREIGN PATENT DOCUMENTS

| | | |
|---|---|---|
| 0023548 | 6/1980 | European Pat. Off. |
| 0221675 | 10/1986 | European Pat. Off. |
| 0231862 | 8/1987 | European Pat. Off. |
| 0255768 | 2/1988 | European Pat. Off. |
| 0278771 | 2/1988 | European Pat. Off. |
| 1391486 | 3/1972 | United Kingdom |
| 1431521 | 2/1974 | United Kingdom |
| 1505479 | 9/1976 | United Kingdom |
| 1604833 | 3/1977 | United Kingdom |
| 1557821 | 12/1979 | United Kingdom |

*Primary Examiner*—Robert A. Dawson
*Assistant Examiner*—Wanda L. Millard
*Attorney, Agent, or Firm*—Oblon, Spivak, McClelland, Maier & Neustadt

[57] ABSTRACT

An assembly is provided of a filter bowl (10), a cartridge (12) and a head (11) in which the filter bowl (10) can be removed after it has descended from the filter head (11) through a distance corresponding to only a minor part of the length of the filter cartridge (12). The cartridge (12) is a push fit into a vertical port (52) in the filter head (11). Flange (18) of the cartridge (12) and a slotted buttress (44) of the bowl (12) establish a mechanical connection between the filter bowl (10) and the cartridge (12) so that the filter bowl (10) and the filter cartridge (12) are together mounted to and demountable from the filter head (11). The filter cartridge (12) having the support flange (18) that coacts with the buttress (44).

13 Claims, 5 Drawing Sheets

FILTER ASSEMBLY AND CARTRIDGE THEREFOR

This invention relates to a filter assembly and to a filter cartridge adapted to form part of such an assembly.

It is well known in the gas and liquid filtration art to provide a filter housing in the form of a filter bowl and a filter head and to provide a separate consumable filter cartridge for fitting into the bowl. For assembling the filter, the cartridge is conventionally attached first to the filter head, followed by the filter bowl. But this conventional method of assembly is wasteful of space because the filter bowl has to be slid axially over the cartridge before it can engage the filter head, subsequent removal requiring the reverse procedure. A free space has to be provided beneath the filter head whose length equals the sum of the lengths of the the cartridge and the filter bowl. Where compactness is desired, or where the filter assembly forms part of a crowded installation, this waste space can be a disadvantage.

It is therefore an object of the invention to provide an assembly of filter bowl, cartridge and head in which the filter bowl can be removed within a "freeboard" which is only a part, and preferably only a minor part, of the length of the filter cartridge.

Broadly stated the invention provides an assembly of a filter cartridge, bowl and head wherein the bowl and cartridge are removable together from the head in a non-axial direction once the bowl has descended a short distance from the head.

In a further aspect the invention provides a filter assembly comprising a filter head, a filter bowl mountable to the filter head and a filter cartridge that fits in the bowl and connects to a fluid flow port in the filter head, wherein means establishes a mechanical connection between the filter bowl and the filter cartridge so that the filter bowl and the filter cartridge are together mountable to and demountable from the filter head.

Conveniently, the filter cartridge and the filter head fit together by a spigot and socket connection which may be fluid-tightly sealed by means of at least one O-ring seal. The advantage of this spigot and socket connection is that the cartridge is mounted to the filter head simply by pushing and is demounted from the filter head simply by pulling. With this arrangement the filter cartridge and bowl can be installed and removed with a "freeboard" which need only be equal to or slightly greater than the length of a neck or spigot of the filter cartridge. The spigot is preferably part of the cartridge as indicated above and the socket is preferably a vertical port in the filter head, but the spigot could also depend from the filter head and fit into a socket in the cartridge.

In a preferred arrangement, the spigot and socket are sealed by a pair of axially spaced seals between which is defined a space fluid-tightly isolated from the filter bowl or the filter head, and a port opens into this space the pressure or flow through the port depending on and providing an indication of the presence or absence of a cartridge in the bowl.

The top inner face of the bowl may have seat means on which a projection of the cartridge fits, and may also have internal buttresses, the cartridge projection being shaped to pass the buttresses in one angular position and to be trapped beneath the buttresses in other angular positions.

The filter head and the filter bowl advantageously have bayonet formations for connecting them together, rotation of the bowl from its unengaged position causing the bayonet formations to cam the bowl gradually upwards towards the filter head, the same small axial movement engaging the cartridge fully home in the filter head. Conveniently there are four bayonet connections disposed at 90° intervals about the filter bowl, a male part of the bayonet formations including shallow ramps leading to level faces defining the intended working axial relative position of the filter bowl and the filter head.

The filter bowl may carry a pressure relief valve and latch means that snaps into a recess in the filter head at one angular position at which the bayonet connection is established to prevent relative rotation of the filter head and the filter bowl but is prevented from engagement at other angular positions, the latch means being decoupled from the valve when in its engaged state but being operatively coupled to the valve when in a disengaged state to open the valve, fluid flow through the valve giving a warning of pressure in the filter bowl.

In a further aspect, the invention provides a filter cartridge for use with a filter bowl having internal buttresses and removably mountable to a filter head, said cartridge having a projection or projections complementary to the buttresses which at one angular position can pass the buttresses for insertion of the cartridge into and removal of the cartridge from the filter bowl and which at other angular positions is or are trapped beneath the buttresses so that the cartridge is removed with the bowl when the bowl is dismounted from the filter head.

In a cartridge as aforesaid the projection may be a flange located towards the top of the cartridge, the flange being formed with cut-outs conforming to the shape and position of the buttresses. The top face of the cartridge may have an upstanding spigot for reception in a port of the filter head. The cartridge may have an outer casing moulded in upper and lower portions fastened together, the projection or projections occurring on the upper portion. The casing is advantageously of moulded plastics and the filter bowl and filter head may be moulded or cast in aluminium or light alloy. The cartridge may contain a moulded or pleated microporous element and may be adapted for coalescing droplets from a gas stream. Alternatively it may contain an adsorbent element and may be adapted for removal of vapour from a gas stream by adsorption.

An embodiment of the invention will now be described, by way of example only, with reference to the accompanying drawings, in which.

Figure 4A:
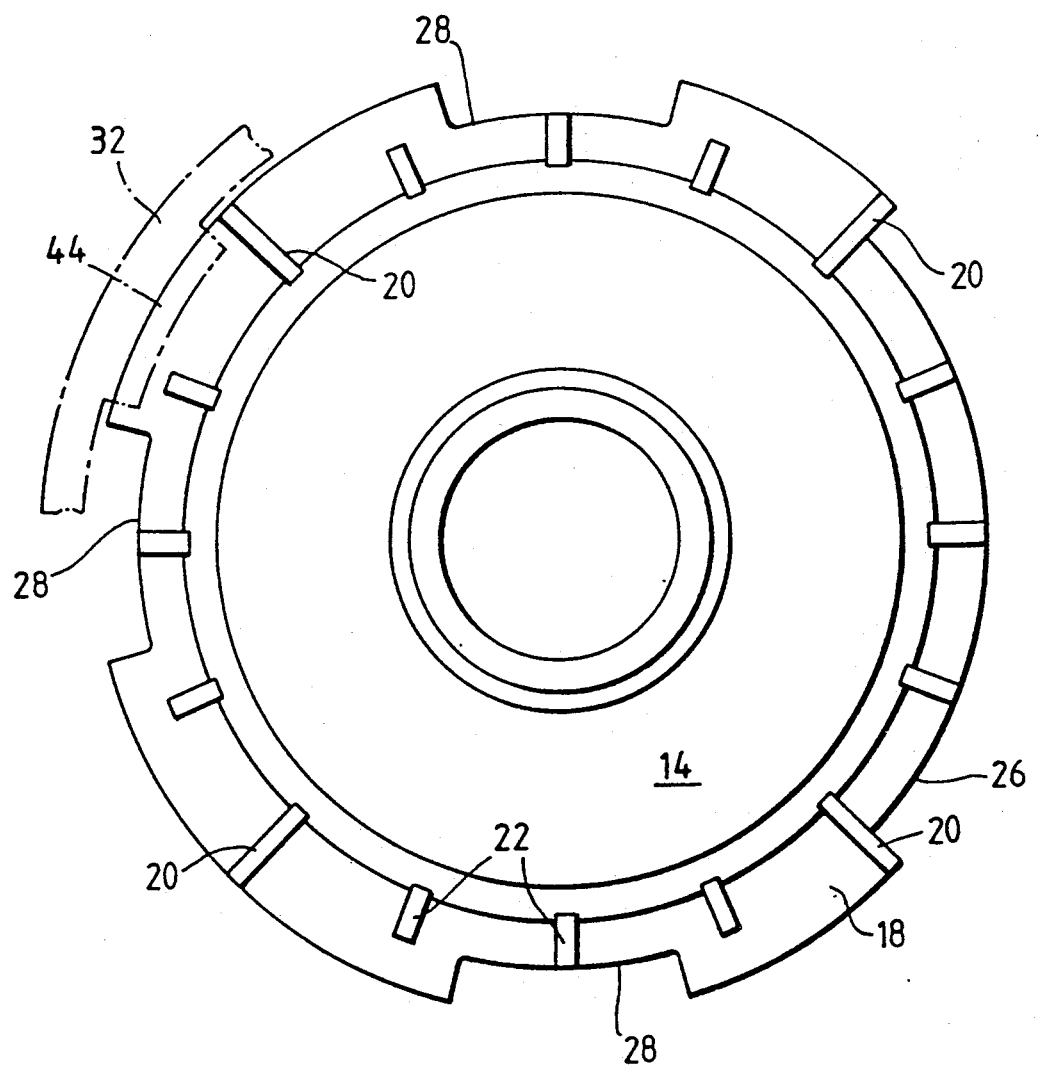
FIGS. 4a and 4b are plan views of the filter cartridge showing a fragment of the outer wall of the filter bowl in a first relative position of the bowl and filter head corresponding to a locking position of the filter bowl to the head and in a second locking position corresponding to locking of the filter bowl to the filter head.
Figure 4B:
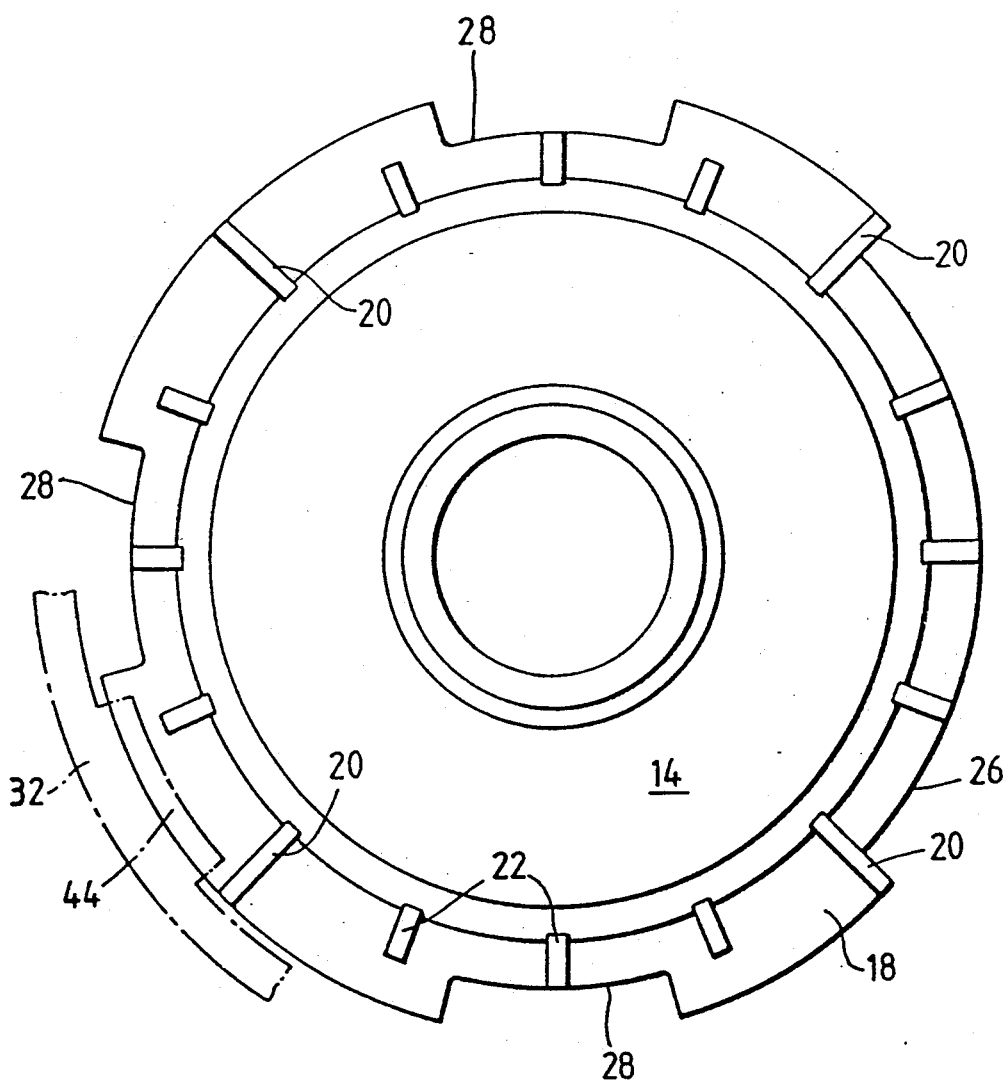

In the drawings, a filter bowl 10 is mountable to and demountable from a filter head 11 and houses a consumable filter element or cartridge 12 which may be a vapour coalescing filter of the general kind described in our Pat. No. GB-A-1603519 and 1557821 or may be an activated carbon filter element as described in our Pat. No. GB-B-2109268 or may be a dust removal filter or may be a combined filter and adsorption element. The working parts of the cartridge 12 are housed in a casing of plastics or other suitable material having an upper portion 14 attached by adhesive or other suitable means to a lower portion 16. The upper portion 14 is formed with a flange 18 projecting radially outwards therefrom and reinforced at intervals about the periphery of the upper portion 14 by upper and lower vertical webs 22,24 of triangular form extending part-way across the flange 18. It is also reinforced on its upper face with four generally rectangular top webs 20 extending the full distance across the flange 18. As seen in FIGS. 4a, 4b, the flange 18 is formed with a first cut-out 26 of relatively large angular extent and with three second cut-outs 28 of relatively small angular extent, the four cut-outs being disposed symmetrically at equi-angular intervals about the periphery of the flange 18. The relatively large first cut-out 26 is to allow the cartridge to enter a bowl having a pressure relief valve generally indicated by the reference numeral 38. The four rectangular top webs 20 occur at the ends of the first cut-out 26 and midway between each pair of second cut-outs 28 (FIGS. 4a,4b). However, if the valve 38 were omitted, the cut-outs could all be of the same angular extent, and there could be three such cut-outs or more than four with corresponding formations (described below) in the inner face of the filter bowl 10.

Figure 1:
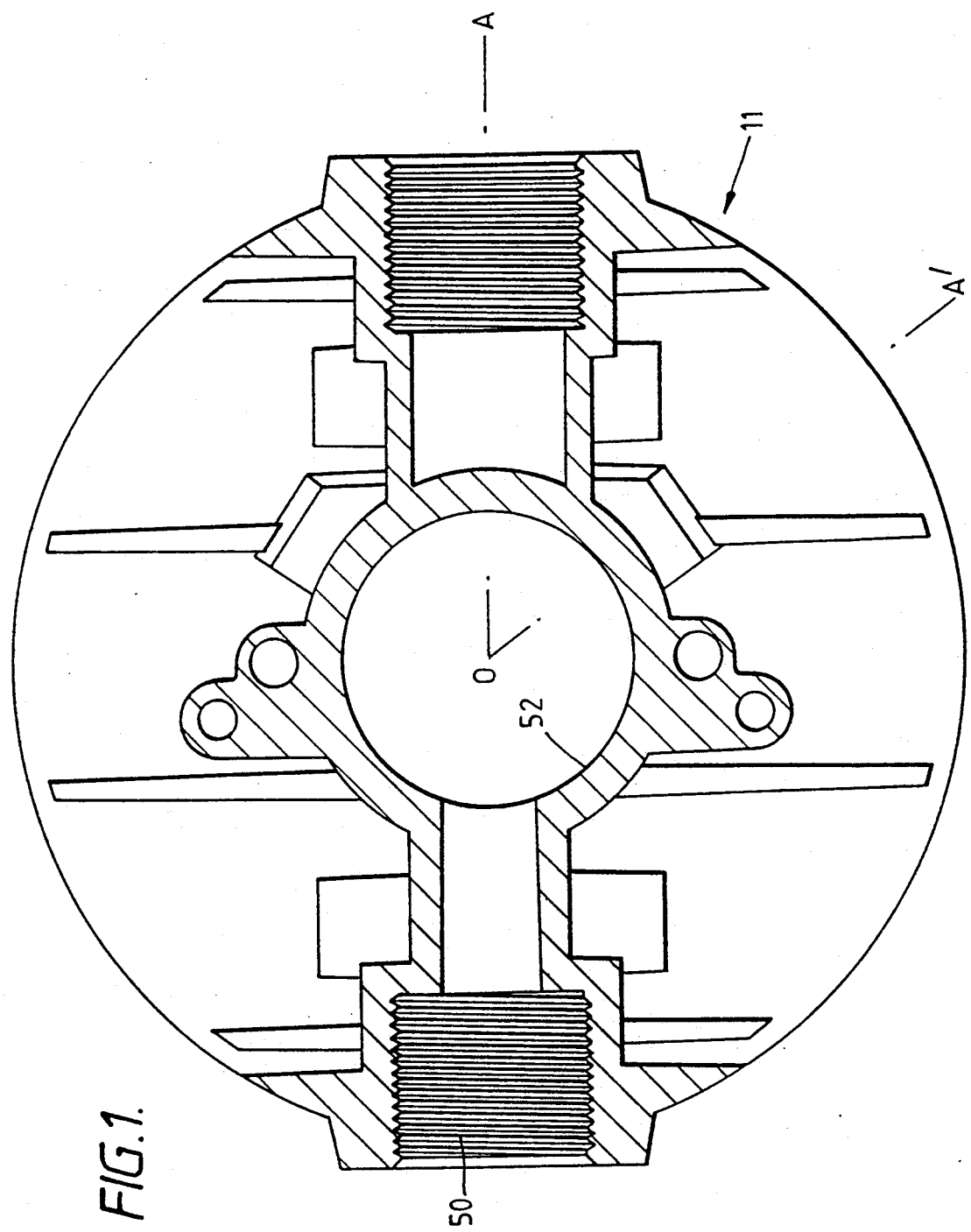
FIG. 1 is a view of a filter head in horizontal section.
Figure 2:
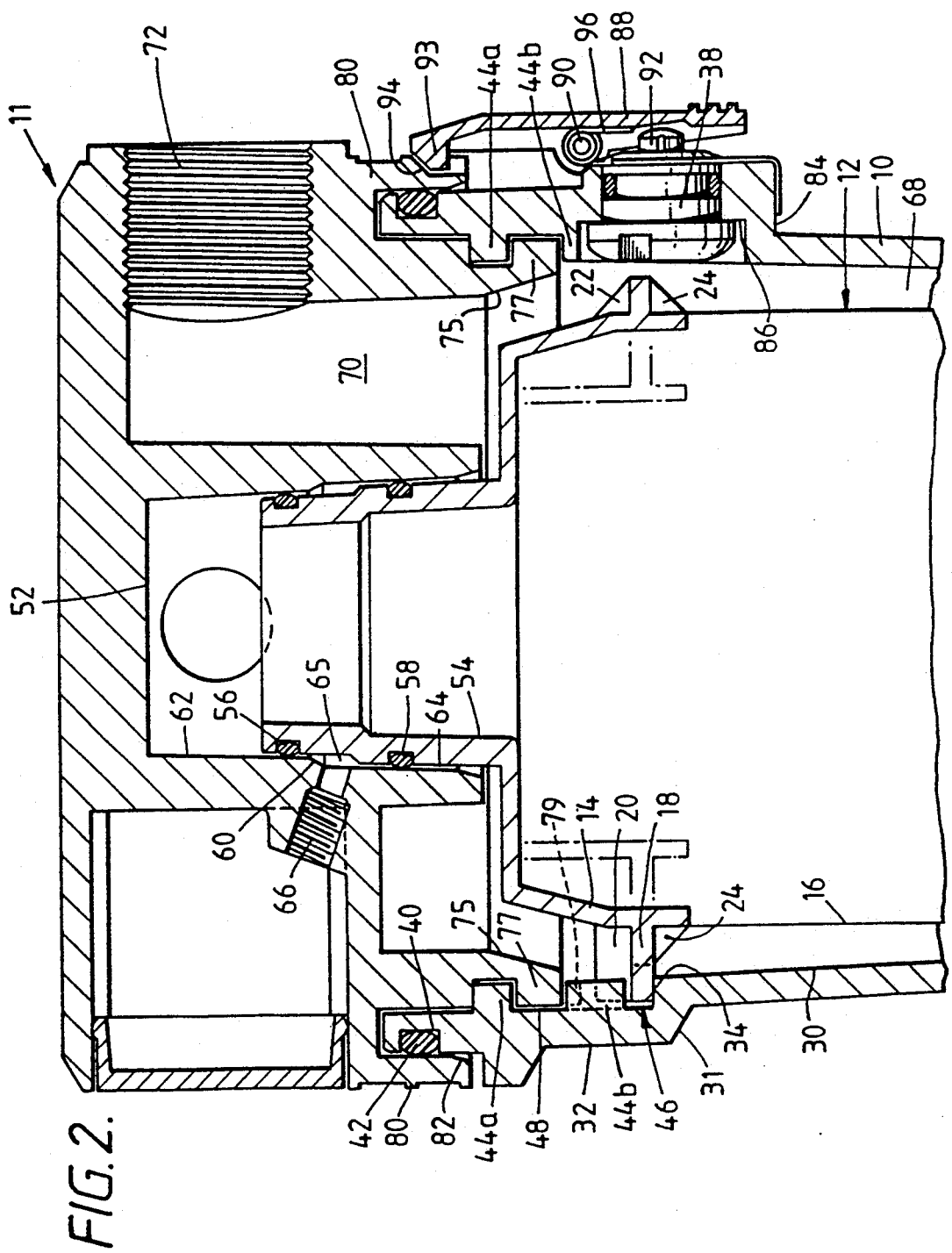
FIG. 2 is a view of the filter head and upper portions of a filter bowl and of a filter cartridge in the bowl, the view being taken in vertical composite section on the lines 0-A and 0-A' of FIG. 1.
Figure 3:
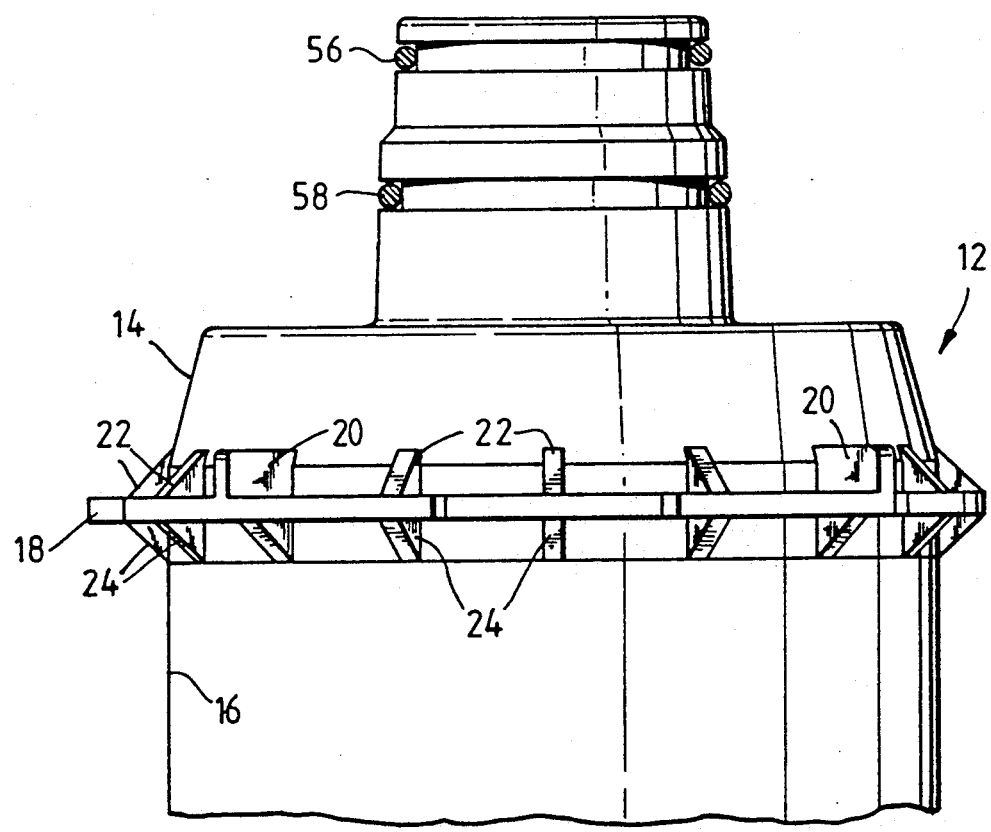
FIG. 3 is a side view of upper parts of the filter cartridge.

As seen in FIG. 2, the filter bowl 10 has a lower region 30 connected at a transition region 31 to a radially enlarged top region 32 by a horizontal step 34 which defines a seat on which the flange 18 rests and thereby supports the cartridge 12 in an intended axial position relative to the bowl 10. The outer face of the top region 32 is formed with a groove 40 in which an O-ring 42 fits and is retained during mounting of the bowl 10 to and during demounting of the bowl 10 from the filter head 11. Internally of the top region 32 there are formed three vertically directed horizontally interrupted buttresses 44 disposed at 90° intervals about the axis of the bowl 10. Each buttress 44 is formed with a lower part 44b that arises at a small clearance above the horizontal step 34 and acts firstly as an abutment limiting axial travel of flange 18 and secondly as a physical stop limiting angular travel of the bowl 10. Each buttress 44 is also formed with an upper part 44a that acts as a bayonet ramp follower. A first groove 46 is defined between the buttress lower parts 44b and the step 34 and receives the flange 18. Thus the second cut-outs 28 are dimensioned and positioned so that when the cartridge 12 is in an angular position such that they align with the buttresses 44 the cartridge 12 can pass axially downwards into the bowl 10 until flange 18 seats onto step 34. Displacement of the cartridge 12 in either angular direction engages flange 18 into groove 46 and the lower part 44b of each buttress then limits upward travel of the cartridge 12 which is therefore mounted to and demounted from the filter head 11 as a unit with the bowl 10. It is understood that the groove 46 at each buttress 44 is of the same height, has a common datum with that at each other buttress 44 and is directed parallel to the step 34. The upper part 44a of each buttress acts as a bayonet ramp follower and defines a second groove 48 with the lower part 44b. Again the second groove 48 at each buttress 44 is of the same height, has a common datum with that at each other buttress 44 and is directed parallel to the step 34. Each buttress 44 has a relatively small angular extent (about 24°), the corresponding intervals being relatively large (about 66°), these intervals not being critical but being selected to provide an effective and robust interface.

Referring now to the the structure of the filter head 11, a first threaded or bayoneted port 50 leads to the interior of the cartridge 12 via a vertical port 52 which receives a spigot 54 upstanding from the upper casing portion 14. The port 52 is stepped at 60. An upper cartridge O-ring 56 seals against an upper smaller diameter portion 62 of the port 52 and a lower cartridge O-ring 58 seals against a lower larger diameter portion 64 thereof. When the cartridge 12 is correctly fitted to the filter head 11 the O-rings 56, 58 define an annular space 65 bounded by spigot 54 and vertical port 52 that is isolated from the prevailing pressure of fluid (usually gas) within the bowl 10 and head 11. A port 66 which conveniently is formed by post-drilling downwardly at a small angle communicates with the space 65 and may be threaded as shown for connection thereto of a pressure transducer (not shown) or other pressure-sensitive device. In the absence of a cartridge 12 in the bowl 10 or if the cartridge 12 is incorrectly fitted the state of the transducer or other device connected to the port 66 is determined by line pressure, and differs from the state when a cartridge is present. By this means an indication of the presence or absence of the cartridge 12 may be given either on the side of the filter head 11 or at a remote location. An outer chamber 68 is defined between the cartridge 12 and the bowl 10 and leads via a radially offset vertical port 70 in the filter head 11 to a second threaded or bayonet port 72. The ports 50, 72 are interchangeably inlets and outlets to the cartridge 12 depending on the intended direction of fluid flow.

A depending cylindrical wall 75 is formed about the vertical port 52 on the under-side of the filter head 11 at an intermediate radial position. At its lower edge the wall 75 carries on its outer face radially projecting bayonet locking elements 77 each complementary to the buttresses 44. As shown in our patent application No. EP-A-0278771 (the disclosure of which is incorporated herein by reference) each locking element 77 has a lead-in ramp along its top edge leading to a horizontal region, and has at its end opposite to the ramp a depending lock tooth 79. Externally of the wall 75 a solid annular underface of the head 11 leads to a depending outer cylindrical wall 80, a lower portion of whose inner face is formed with a lead-in portion 82.

The filter bowl 10 is formed at one angular position with a protuberance 84 having a relieved inner face 86 that enables the pressure relief valve 38 to be fitted without the valve 38 intruding into the envelope of the outer chamber 68, the structure and method of fitting of the valve 38 being as described in our patent application No. EP-A-0278771. A buttress 44 occurs on the inner face of the protuberance 84 and has an upper portion 44a and an abbreviated lower portion 44b above valve 38, but the step 34 is locally absent. Thus the bowl 10 is held to the head 11 at four positions 90° apart. The horizontal step 34 is present for most of the periphery of the flange 18 to support the cartridge 12 against download, but upward force on the cartridge 12 is taken at three angular positions 90° apart corresponding to the other three lower buttress parts 44b.

A pivoted locking lever or handle 88 which is of generally rectangular form when viewed from outside the bowl 10 is pivoted to the bowl 10 at 90 and is arranged to co-operate with a pintle 92 of the valve 38 so that the valve 38 is open when the handle 88 is pivoted outwardly from the vertical position shown. When the bowl 10 is other than rotated fully home, a head 93 of the handle 88 rides on the outer cylindrical surface of the wall 80, maintaining the handle 88 in its outwardly pivoted attitude and maintaining the valve 38 open. But when the bowl 10 reaches its fully home position, the head 93 snaps into recess 94 under the action of spring 96, de-coupling handle 88 from valve 38 which then closes by the action of an internal spring to enable the bowl 10 to be pressurised. The bowl 10 and head 11 can be connected together by relative rotation to engage bayonet coupling means 44.77 thereof. When they are connected together, an outer wall 80 of the head 11 overlaps top portion 32 of the bowl 10 with a fluid-tight O-ring seal 42 therebetween. The handle 88 acts as a spring latch that engages at one angular position of the bowl and head when the bayonet coupling has been established to prevent relative rotation of the bowl and head, but the handle 88 cannot engage at other angular positions. The handle 88 is de-coupled from the valve 38 when it has engaged into the recess 94, but when it is disengaged from the recess 94 it becomes operatively coupled to the valve 38 to open the valve 38. Fluid flow through the valve 38 when it is open provides an audible warning when a pressure differential exists across the valve 38.

For assembly of the bowl 10, cartridge 12 and head 11, the cartridge 12 is first dropped into the bowl 10, the cut-outs 28 being aligned with the buttresses 44. If desired the cartridge 12 can then be rotated manually to engage the flange 18 into the groove 46. The bowl 10 and cartridge 12 are then offered to the head 11, engaging the spigot 54 into the vertical port 52, the bowl 10 being at an angular position offset from the working position and defined by sight marks so that the buttresses 44 enter gaps between the bayonet locking elements 77. The bowl 10 is then rotated to engage the bayonet locking elements 77 into the grooves 48. The upper parts 44a ride up the ramps onto the horizontal parts and travel is limited by abutment of the lock teeth 79 with the lower parts 44b of the buttresses, at which time the lever 88 also snaps to the vertical position. As the bowl 10 is offered up, the O-ring 42 seals against the inner face of wall 80. The piston seal configuration of O-ring 42 between walls 75, 80 gives excellent long-term performance at high operating pressures and standard O-rings can be used, the overlap preventing the O-ring 42 from being extruded between walls 75, 80 by the elevated internal pressure of the bowl 10. When it is desired to remove the bowl 10, the first action is to depress the lower part of handle 88 by finger pressure, thereby opening valve 38 and de-pressurising the bowl 10. The bowl can be rotated in the release direction, and as is apparent from FIGS. 4a and 4b which show the position of of the buttresses 44 in the alternative locking positions with a release position between them, the buttress rotates through register with the cut-out 28 but then re-engages onto the flange 18, the rectangular webs 20 serving as stops. It will be appreciated that rotation of the bowl 10 does not bring about simultaneous rotation of the cartridge 12 because of the tight fit of the O-rings 56, 58 in the vertical port 52. When the bowl 10 has been rotated to the release position, it is pulled downwards and mechanical engagement of the lower buttress parts 44b with the flange 18 ensures that the cartridge 12 descends as the bowl 10 descends. The bowl 10 need only travel down until the spigot 54 is clear of the wall 75, after which the bowl 10 together with the cartridge 12 can be withdrawn sideways. Consequently mounting and removal of the bowl 10 and cartridge 12 can be carried out with a minimal amount of free space. Even under slight internal pressure, gas escaping through the valve 38 gives rise to a clearly audible hiss, and the valve 38 remains open with continuing hiss of any escaping gas until the bowl is removed. Accordingly there is a warning against accidental removal of the bowl 10 when it is under pressure. An advantage of the above arrangement is that shallow lead-in ramps on the bayonet locking elements 77 provide a low-torque connection between the bowl 10 and the head 11 also gradually engaging the spigot 54 into the vertical port 52, and requiring only a quarter turn to lock and unlock. The handle 88 gives a positive mechanical lock between the bowl 10 and the head 11. Furthermore, in the case of an oil coalescing filter or the like which has an external sock e.g. of plastics material at part of its lateral surface the above method of mounting the cartridge 12 to the head 11 reduces the likelihood of handling the sock and so avoids the accidental production of local areas of enhanced flow of oil or other coalesced liquid.

The casing of the cartridge 12 may conveniently be injection moulded in plastics and the head 11 and bowl 10 may be cast or moulded in aluminium or in light alloy or in zinc or other convenient metallic or non-metallic material.

We claim:

1. A filter assembly comprising:
    a filter head;
    a filter bowl removably mountable to the filter head;
    a filter cartridge that fits in the bowl and is removably captive therein;
    means for establishing a connection between the filter cartridge and a fluid flow port in the filter head; and
    means for establishing a bayonnet connection between the filter bowl and filter cartridge so that the filter bowl and the filter cartridge are together mountable to and demountable from the filter head.

2. An assembly according to claim 1, wherein the filter cartridge and the filter head fit together by a spigot and socket connection.

3. An assembly according to claim 2, wherein at least one O-ring seal fluid-tightly seals the spigot and socket connection.

4. An assembly according to claim 3, wherein a pair of axially spaced seals fluid-tightly seal the spigot and socket connection and define therebetween a space fluid-tightly isolated from the filter bowl and the filter head, a port opening into this space at which pressure or fluid flow depends upon the presence or absence of a cartridge in the bowl.

5. An assembly according to claim 1, wherein a top inner face of the bowl has seat means on which a projection of the cartridge fits, and has internal buttresses, the cartridge projection being shaped to pass the buttresses in one angular position and to be trapped beneath the buttresses in other angular positions.

6. An assembly according to claim 5, wherein the filter head and the filter bowl have bayonnet formations for connecting them together.

7. An assembly according to claim 6, wherein there are four bayonnet connections disposed at 90 degree intervals about the filter bowl.

8. An assembly according to claim 6, wherein the filter bowl carries a pressure relief valve and latch means that snaps into a recess in the filter head at one angular position at which the bayonnet connection is made to prevent relative rotation of the filter head and the filter bowl but is prevented from engagement at other angular positions, the latch means being decoupled from the valve when in it engaged state but being operatively coupled to the valve when in a disengaged state to open the valve, fluid flow through the valve giving a warning of pressure in the filter.

9. An assembly according to claim 1, wherein the filter cartridge has an outer casing moulded in upper and lower portions fastened together by a projection, the projection or projections occurring on the upper portion.

10. An assembly according to claim 9, wherein the outer casing is of moulded plastics.

11. An assembly according to claim 1, wherein the filter cartridge contains a microporous element and is adapted for coalescing droplets from a gas stream.

12. An assembly according to claim 1, wherein the filter cartridge contains an adsorbent and is adapted for removal of vapour from a gas stream by adsorption.

13. A filter assembly comprising a filter head, a filter bowl removably mountable to the filter head and a filter cartridge that fits in the bowl in which the filter cartridge is removably captive and connects to a fluid flow port in the filter head, wherein means establishes a bayonnet connection between the filter bowl and the filter cartridge so that they are together mountable to the filter head and are together demountable from the filter head with the cartridge being positively demounted from the filter head when the bowl is demounted and the bowl and cartridge together being removable once the bowl has descended a short distance from the filter head.

* * * * *